Patented Aug. 22, 1933

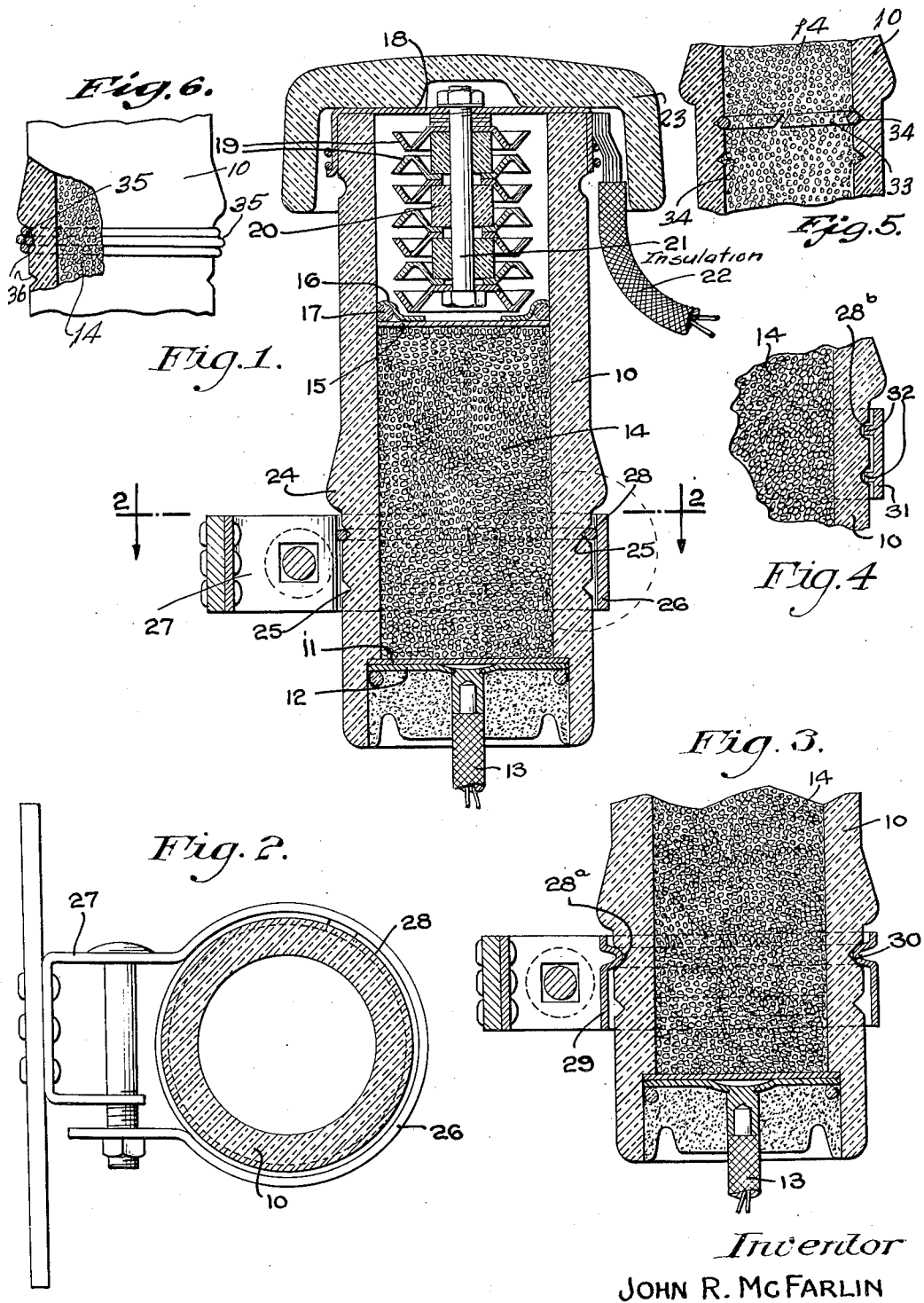

1,923,943

UNITED STATES PATENT OFFICE 1,923,943

LIGHTNING ARRESTER

John R. McFarlin, Philadelphia, Pa., assignor to Electric Service Supplies Company, Philadelphia, Pa., a Corporation of Pennsylvania Application September 15, 1931
Serial No. 562,839

10 Claims. (Cl. 175—30)

This invention relates generally to electrical protective devices and more particularly to improvements in lightning arresters for rendering the same more positive in operation under certain abnormal potential conditions.

Lightning arresters may be likened generally to electrical safety valves in that they are generally adapted for insertion between an electrical conductor and ground, the principal functions of a lightning arrester being to relieve the conductor of potentials higher than a predetermined normal potential such as might endanger the insulation of apparatus connected in circuit with the conductor, and further to prevent the continued flow of dynamic or system current of predetermined voltage to ground through the arrester following the discharge to ground of the abnormally high potentials. In other words, the lightning arrester functions as a valve in so far as it permits current of a voltage above a predetermined value to flow through it to ground while preventing current of a voltage lower than said predetermined value from continuously flowing therethrough.

It is vitally necessary that a lightning arrester operate at all times to effectively prevent a continued flow of system current through it to ground and under normal conditions of operation this objective ordinarily obtains. Under abnormal conditions, as for example when a high voltage line comes into contact with a line of lower voltage on which the arrester is installed, damage to the arrester may result to an extent sufficient to prevent its normal operation and in consequence of which system current may continue to flow through the arrester to ground. When this condition arises and the power capacity of the circuit to which the lightning arrester is connected is so low as to provide insufficient energy to render the arrester immediately and totally inoperative against the further passage therethrough of current, there results a continuous flow of current through the lightning arrester which under ordinary conditions effects the operation of fuses or circuit breakers to open the circuit. Attempts to reenergize this circuit by replacing the fuses or by closing the circuit breakers generally result in the immediate blowing of the fuses or reopening of the circuit breakers, this condition continuing until the defective lightning arrester has been located and removed from the circuit. Not only does this result in considerable trouble, expense and loss of time but also in the inconvenience resulting from the fact that the circuit is without power until such time that the location and removal of the defective arrester is effected.

Among the principal objects of the present invention is to provide a lightning arrester which is so designed that an excessive heat evolution, caused by abnormal flow of current therethrough will effect its positive destruction and so render it inoperative against the passage of current therethrough and at the same time provide a visual indication that the arrester has failed.

A further object of the invention is the provision of a lightning arrester which while of sufficiently rugged construction to permit of its economical manufacture and safe transportation and installation, is yet of such constructional design as will secure its immediate and positive total destruction in case of internal damage thereto.

A still further object of the invention is to provide a lightning arrester of such character that when subjected to an abnormal flow of current therethrough sufficient to effect its internal damage, it will quickly and positively clear itself from its connected circuit even under conditions where the circuit power available for the destruction of the arrester is relatively low.

Other objects and advantages of the invention will be apparent more fully hereinafter.

The invention consists substantially in the combination, construction and relative arrangement of parts, all as will appear more fully hereinafter, as shown in the accompanying drawing and as finally pointed out in the appended claims.

In the accompanying drawing, which is intended merely to illustrate the principles of the invention, it will be observed that the invention is shown applied to a lightning arrester of the type to be described hereinafter. It will be understood, however, that the present invention is equally applicable to lightning arresters of types other than that described herein and it is not intended therefore to limit the present invention to the particular type of lightning arrester illustrated in the accompanying drawing.

In the said accompanying drawing:—

Figure 1 is a vertical sectional view of a lightning arrester assembly constructed in accordance with and embodying the principles of the present invention;

Figure 2 is a horizontal sectional view taken on the line 2—2 of Figure 1;

Figure 3 is a vertical sectional view of the lower portion of a modified form of the improved lightning arrester assembly;

Figure 4 is a sectional view corresponding to the portion inscribed within the broken line circle of Figure 1 and showing a modification thereof;

Figure 5 is a partial sectional view showing a modified form of the lightning arrester assembly; and Figure 6 is a partial elevational view, partly in section, showing a still further modification of the lightning arrester assembly.

In order that the invention may be the more fully understood, the constructional characteristics of the illustrated lightning arrester will be briefly described, although it will be understood that the general principles of the invention are applicable to other types of lightning arresters. Referring now more particularly to the drawing, it will be observed that the illustrated lightning arrester comprises a non-conducting, substantially cylindrical casing or main body portion 10, preferably of porcelain, into the lower end of which is cemented the ground assembly consisting of metallic plates 11 and 12 and the ground lead 13.

Filling a substantial portion of the casing 10 and in electrical contact with the plate 11 is a discrete mass of crystalline conducting material 14, such as silicon carbide crystals. This granular mass of conducting material is confined within the casing 10 by an upper metallic plate 15, the latter having associated therewith a suitably flanged gasket-retaining element 16 for pressing a gasket 17 into intimate engagement with the inner wall of the casing 10.

The top end of the casing 10 is provided with a metallic closure cap 18 from the central point of which are suspended a plurality of vertically spaced pairs of dished spark gap electrodes 19, each pair of these electrodes being maintained in predeterminedly spaced relation by the respective insulators 20. These insulators 20 and the electrodes 19 are maintained in the assembled relation shown by an insulating tie-rod 21. The line lead 22 is securely clamped and soldered to the metal cap 18 and the arrester assembly is completed by a porcelain cap 23 which is preferably secured in place by means of a sealing compound introduced into and filling the space between it and the exterior of the casing 10.

It is sufficient for the purpose of understanding the present invention to point out that the crystalline conducting material 14 possesses the property of changing in resistance in inverse ratio to the voltage applied thereto. High voltage currents, such as those due to lightning and other abnormal conditions, enter the arrester through the line lead 22, metal cap 18 and spark gap electrodes 19, and thence flow to ground through the crystalline material 14, plates 11 and 12 and ground lead 13, the crystalline material offering relatively low resistance to the passage and thereby facilitating the discharge of these high voltage disturbances. The normal or system current, however, being of considerably lower potential value and tending to follow the abnormally high potential current to ground through the arrester, after cessation of the high potential current automatically encounters a high resistance path through the crystalline material in consequence of which and aided by the actions of the gaps between electrodes 19, its passage through the arrester is effectually precluded.

The thermal capacity of lightning arresters is generally quite limited and under certain conditions the system current may reach such value and be of such sustained duration that the heat generated by its passage through the crystalline material is too great to be absorbed by the latter. In consequence of this an excessive heating occurs and a permanent conducting path is fused through the crystalline material, thus affording a relatively low resistance path through which the system current will continue to flow. The effectiveness of the lightning arrester is thus obviously destroyed and its immediate removal and replacement becomes imperative.

It will be understood that if there is sufficient capacity in the circuit, sufficient heat will be generated in the arrester as to cause it to shatter and break open, thereby automatically opening the connection between the circuit to be protected and ground. However, under conditions of limited circuit capacity such destruction of the lightning arrester might not ordinarily occur in consequence of which the circuit remains definitely grounded through a defective arrester, and it is to avoid this possibility that the present invention has been developed.

In carrying out the invention, certain mechanical strains are introduced in the casing 10 of the arrester to facilitate and expedite the positive fracture thereof under predetermined conditions. Referring now again to the drawing and more particularly to Figures 1 and 2 thereof, it will be observed that the casing 10 is provided below its supporting bead 24 with one or more circumferentially extending grooves 25, preferably of V-shaped cross-section. As appears in Figure 1, two grooves are provided, the vertical spacing therebetween being such as to permit them to be commonly embraced by the clamping band 26 of the arrester mounting bracket 27. It will be understood, however, that the clamping band 26 does not necessarily embrace both grooves in all instances. In some installations it may be found preferable to arrange the clamping band in embracing relation with respect to only one or the other of the grooves, the remaining groove being located without the confines of the clamping band.

Seated within either or each of the grooves 25 is a wire 28 the length of which is such as to nearly but not completely fill the groove circumferentially. The wire is preferably of circular cross-section where it is intended for reception within a V-shaped groove. Experience has indicated that best results are attainable where a pair of grooves are employed with the wire seated in the upper one thereof only. Pressure is then applied to the wire or wires 28 by drawing up more or less tightly the clamping band 26 of the mounting bracket. This tends to definitely force the wire into its respective groove and so introduces internal physical strains in the casing 10 in the immediate vicinity of the grooved portion thereof. These strains, while of positive value, are yet insufficient in themselves to effect the fracture of the casing 10 under normal operating and installation conditions.

However, upon internal failure of the arrester, sufficient heat is generated therein due to the passage therethrough of the system current as to introduce additional mechanical and thermal strains in the already strained casing 10 in consequence of which the latter is fractured in the zone of the externally applied pressure. This fracture is so positive and complete in nature that the lower end of the arrester drops completely away from the upper section thereof, thus permitting the free escape of the crystalline material 14 and opening the circuit between the lead line and ground. Furthermore, when the bottom of the arrester drops away as just described, a readily visible indication is had that the arrester has failed.

As mentioned above, I have found it preferable to provide a pair of vertically spaced grooves, within the upper one only of which is clamped the pressure exerting element. In this preferred arrangement, which is shown more particularly in Figure 1, the thermal and mechanical strains induced in the casing 10, upon internal failure of the lightning arrester, produces a crack in the immediate vicinity of the upper groove, which crack extends toward the lower groove and so effects the complete fracture of the casing at or near this latter groove. This fracture immediately results in the separation of the bottom portion of the casing 10 from the upper portion thereof, the latter being retained in position by the clamping bracket. The bottom portion is held in suspended position by means of the ground lead attached thereto and so provides a clear visual indication that that particular arrester has failed and is inoperative.

It will be understood, of course, that the external strains may be initially introduced in the casing 10 in any suitable manner. For example, in Figure 3 the clamping band 29 may be provided with a circumferentially extending internal bead 30 which is adapted to be pressed into the upper groove 28ª of the arrester casing. Or, as shown in Figure 4, a clamping band 31 may be employed which is provided with one or more circumferentially extending internal ribs 32 which are adapted to be respectively forced into the pair of grooves 28ᵇ formed in the arrester body. It will be observed that in the modification shown in Figures 1 and 3, the grooves are of V-shaped cross-section whereas the pressure applying elements are of circular cross-section. In the modification shown in Figure 4, the grooves 28ᵇ are of circular cross-section while the pressure-exerting ribs 32 are of non-circular cross-section.

Nor are the general principles of the invention dependent upon the particular arrangements shown in the drawing. If desired, the pressure-exerting elements may be applied to the arrester casing 10 independently of the mounting bracket and to this end may consist of a wire or band drawn tightly about the casing in the immediate vicinity of the reduced section thereof. It is evident also that the desired initial strains may be introduced from the interior of the casing, as shown in Figure 5, as by employing outwardly pressed heavy circular spring members 33 extending circumferentially about and received within one or more annular grooves 34 formed in the interior wall of the arrester main body.

In addition to the foregoing, the principles of this invention may be carried out by the provision of an endless band or bands of wire 35 encircling the body of the arrester casing and received within one or more circumferentially extending grooves 36 formed in the exterior surface thereof. (See Figure 6). This endless band or wire 35, while not under tension sufficient to impart an initial mechanical strain in the casing body, is yet sufficiently taut that upon expansion of the body due to prolonged abnormal heating within the interior thereof, the body is mechanically strained in the immediate zone of the groove containing the wire, this mechanical strain, in addition to the thermal strains induced in the body, being sufficient to effect the immediate and positive fracture of the arrester casing.

Referring again more specifically to Figure 1, the objects of this invention may be accomplished by more or less loosely laying the wire 28 in the groove 25 and then drawing the clamping band 26 thereabout sufficiently tight to effectively retain the wire in position without, however, establishing any initial strains in the arrester casing, the principle underlying this arrangement being similar to that described in the preceding paragraph, namely, that the arrester casing becomes mechanically strained in the immediate zone of the wire or other strain producing device upon expansion of the casing due to prolonged abnormal heating within the interior thereof. Obviously, similar results may be obtained by the arrangements shown in Figures 3 and 4 wherein either of the specially formed clamping bands may be drawn about the body of the arrester with sufficient tautness that only upon expansion of the body due to prolonged abnormal heating within the interior thereof is there introduced in the body a mechanical strain, this, in addition to the thermal strains induced in the body, being sufficient to effect the immediate and positive fracture of the arrester casing.

From the foregoing it will be apparent that the invention is susceptible of various changes and modifications without departing from the general principles or real spirit thereof, and it is accordingly intended to claim the same broadly, as well as specifically, as indicated by the appended claims.

What is claimed as new and useful is:—

1. An electrical protective device comprising an insulating casing having therein material constituting a current discharge path, and means for introducing in the wall of the casing a circumferentially extending initial mechanical strain of uniform character to facilitate the fracture thereof when the device is subjected to abnormal internal heat.

2. An electrical protective device comprising an insulating casing having therein material constituting an electrical discharge path, and means for applying pressure radially with respect to the wall of said casing whereby to introduce an initial mechanical strain in said wall, said pressure-applying means being operative, upon the generation of abnormal heat within the interior of said casing, to facilitate the positive fracture of said casing whereby to permit the free escape of said material from the interior thereof.

3. An electrical protective device comprising an insulating casing having therein material constituting an electrical discharge path therethrough, a terminal plate in the bottom of said casing and in electrical contact with said material, and means exerting a mechanical pressure upon said casing, said means being operative, upon the generation of abnormal heat in said material, to effect the positive fracture of said casing and so permit said terminal plate to drop downwardly and away from the upper portion of the casing.

4. In a lightning arrester assembly, in combination, a hollow insulating casing having therein material constituting an electrical discharge path therethrough, a ground line extending from the bottom portion of said casing and in electrical contact with said material, said casing being provided in the wall thereof with a circumferentially extending groove, and means wedged within said groove for straining said casing in the immediate vicinity of said groove, said means being adapted to facilitate the separation of said ground line and the portion of the casing secured thereto from the remaining portion of the casing in the case of internal damage of the arrester.

5. In a lightning arrester assembly, in combination, a hollow insulating casing having therein material constituting an electrical discharge path therethrough, a mounting bracket for said casing including a clamping band adapted to be drawn about the body of the casing, and means interposed between said casing body and said clamping band for imposing in said body a mechanical strain sufficient to fracture the same upon the generation of abnormal heat in said material.

6. In a lightning arrester assembly, in combination, a hollow insulating casing having therein material constituting an electrical discharge path therethrough, a bottom terminal plate for maintaining said material within said casing, the latter being provided above said plate with a groove extending circumferentially about the body thereof, and means for applying pressure radially against the body of said casing and in the immediate vicinity of said groove.

7. In a lightning arrester assembly, in combination, a hollow insulating casing having therein material constituting an electrical discharge path therethrough, a pair of axially spaced, circumferentially extending grooves formed in the body of said casing, and pressure-exerting means received in at least one of said grooves for imposing a mechanical strain in the body of said casing in the immediate vicinity of said grooves.

8. In a lightning arrester assembly, in combination, an insulating body containing material constituting an electrical discharge path therethrough, and means in positive contact with the wall of the body for mechanically straining said body in a zone surrounding said material, said means being operative, upon the evolution of abnormal heat in said material, to effect the positive fracture of said body so as to permit the section of said body below said zone to drop downwardly and away from the upper section thereof.

9. An electrical protective device comprising an insulating casing having therein material constituting a current discharge path, and means in positive contact with the wall of the casing for introducing a mechanical strain in said wall to facilitate the fracture thereof when the device is subjected to abnormal internal heat.

10. In an electrical protective device, in combination, a frangible body having material therein constituting a current discharge path, said material being capable of evolving heat sufficient to effect the expansion of said body, and means arranged externally of and in contact with the body and adapted upon said expansion of the body to produce strains therein for facilitating the fracture thereof.

JOHN R. McFARLIN.